United States Patent
Nakamura et al.

(10) Patent No.: US 12,269,445 B2
(45) Date of Patent: Apr. 8, 2025

(54) METHOD AND DEVICE FOR CONTROLLING THE OPERATION OF A HYDRAULIC BRAKING SYSTEM, HYDRAULIC BRAKING SYSTEM, AND VEHICLE

(71) Applicant: Robert Bosch GmbH, Stuttgart (DE)

(72) Inventors: Atsushi Nakamura, Niigata (JP); Andreas Wienss, Eningen Unter Achalm (DE); Georg Widmaier, Leonberg (DE); Oliver Maier, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 280 days.

(21) Appl. No.: 17/659,546

(22) Filed: Apr. 18, 2022

(65) Prior Publication Data

US 2022/0340117 A1 Oct. 27, 2022

(30) Foreign Application Priority Data

Apr. 22, 2021 (DE) ...................... 10 2021 204 017.9

(51) Int. Cl.
*B60T 13/68* (2006.01)
*B60T 8/17* (2006.01)
*B62L 3/02* (2006.01)

(52) U.S. Cl.
CPC .......... *B60T 13/686* (2013.01); *B60T 8/1706* (2013.01); *B62L 3/023* (2013.01); *B60T 2270/10* (2013.01)

(58) Field of Classification Search
CPC .. B60T 13/686; B60T 8/1706; B60T 2270/10; B62L 3/023
(Continued)

(56) References Cited

U.S. PATENT DOCUMENTS 11,807,207 B2* 11/2023 Atsushi ................. B60T 8/3685
2015/0344009 A1* 12/2015 Hagspiel ................. B62L 3/023
303/119.1
(Continued)

FOREIGN PATENT DOCUMENTS

DE 19508915 A1 9/1996
DE 10158382 A1 6/2003
(Continued)

*Primary Examiner* — Christopher P Schwartz
(74) *Attorney, Agent, or Firm* — NORTON ROSE FULBRIGHT US LLP; Gerard A. Messina

(57) ABSTRACT

A method for controlling the operation of a hydraulic braking system of a vehicle and in particular a vehicle drivable using muscle power and/or—in particular additionally—using motor power, an electric bicycle, e-bike, pedelec, or the like. In the method, it is checked whether a discharge condition for discharging an accumulator of the braking system is met. If the discharge condition is met, initially a controllable inlet valve in a primary circuit of the braking system is set into a partially closed state over a predefined duty cycle, in particular of 10%, and/or for a predefined time span and then an outlet valve of the accumulator is opened for a predefined time span—continuously or in intervals—so that brake fluid is discharged from the accumulator via the outlet valve, the primary circuit, and the inlet valve into a reservoir of a master cylinder of the primary circuit.

15 Claims, 8 Drawing Sheets

(58) Field of Classification Search
USPC ... 303/9.62, 9.64, 113.1–113.5, 119.1, 119.2
See application file for complete search history.

(56) References Cited

U.S. PATENT DOCUMENTS

| | | | |
|---|---|---|---|
| 2021/0206359 A1* | 7/2021 | Nakamura | B60T 8/3225 |
| 2022/0274567 A1* | 9/2022 | Nakano | B62L 3/023 |
| 2022/0289154 A1* | 9/2022 | Nakano | B60T 13/148 |

FOREIGN PATENT DOCUMENTS

| | | |
|---|---|---|
| DE | 102005034984 A1 | 10/2006 |
| DE | 102013200419 A1 | 7/2014 |
| DE | 102013200422 A1 | 7/2014 |
| DE | 102016207751 A1 | 11/2017 |
| DE | 102017200053 A1 | 7/2018 |
| DE | 102019219939 A1 | 11/2020 |
| DE | 102020209116 A1 | 3/2021 |
| JP | 2005238901 A | 9/2005 |

* cited by examiner

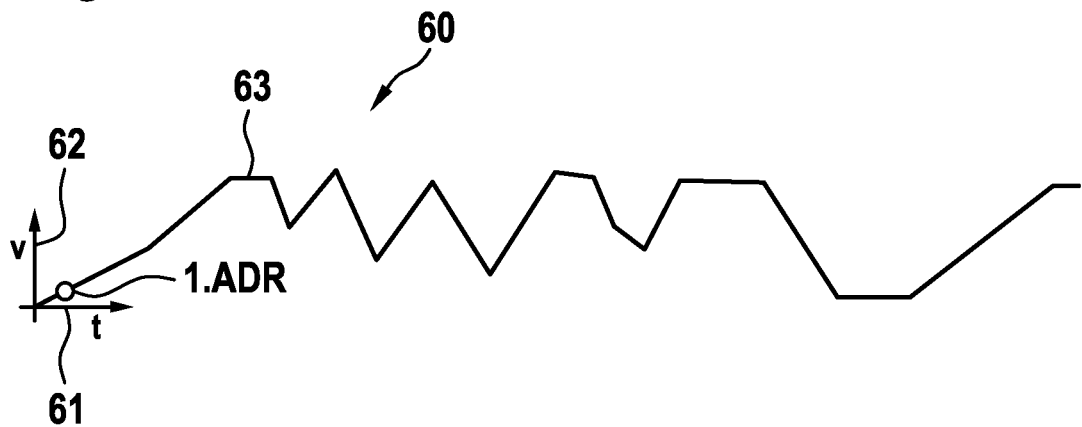
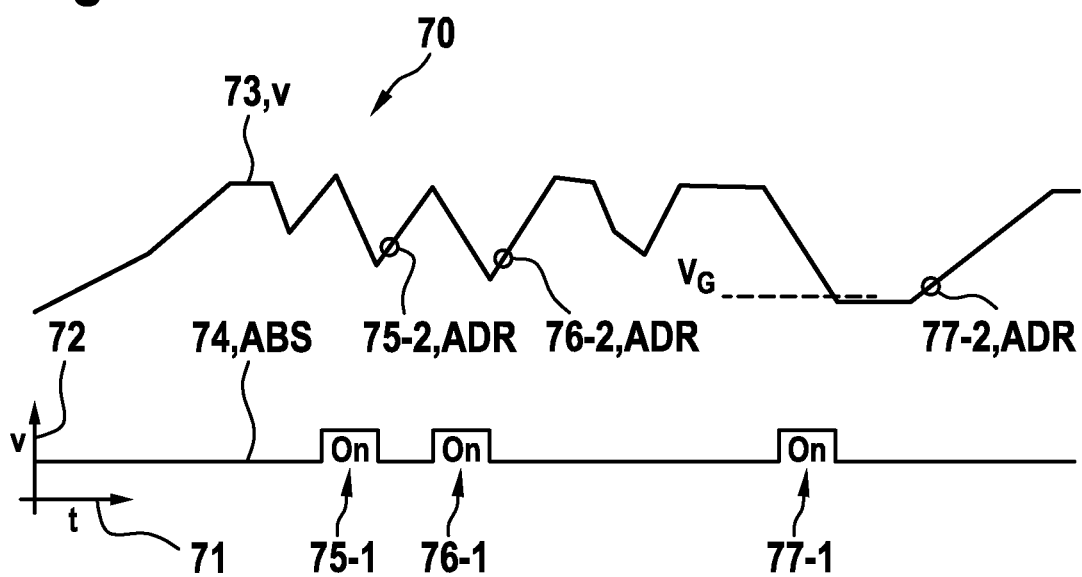

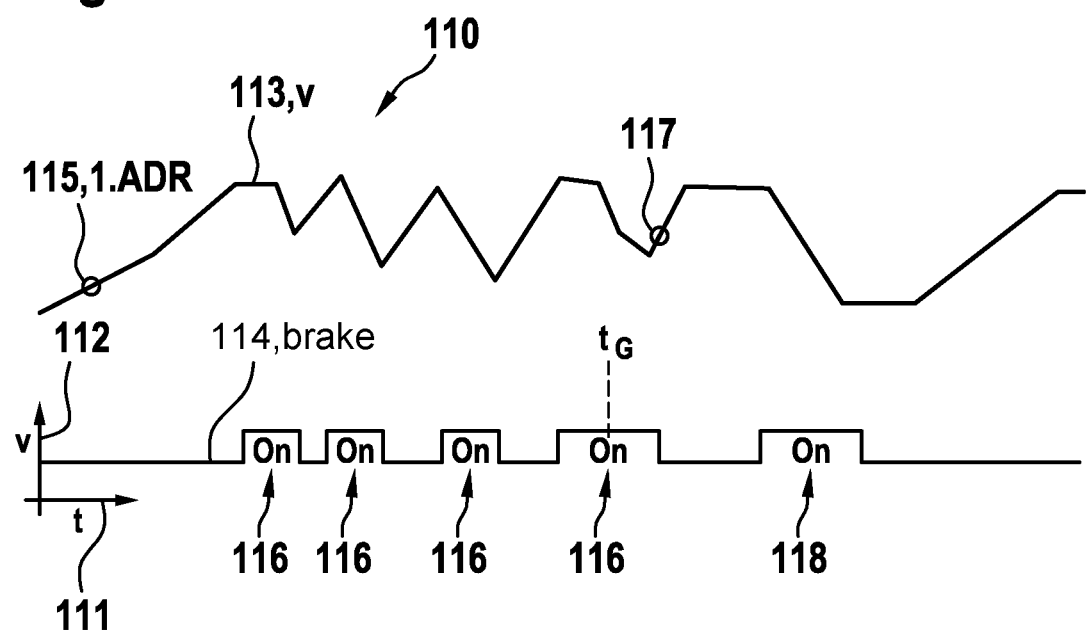

METHOD AND DEVICE FOR CONTROLLING THE OPERATION OF A HYDRAULIC BRAKING SYSTEM, HYDRAULIC BRAKING SYSTEM, AND VEHICLE

CROSS REFERENCE

The present application claims the benefit under 35 U.S.C. § 119 of German Patent Application No. DE 10 2021 204 017.9 filed on Apr. 22, 2021, which is expressly incorporated herein by reference in its entirety.

BACKGROUND INFORMATION

The present invention relates to a method and a device for controlling the operation of a hydraulic braking system of a vehicle and a hydraulic braking system and a vehicle as such. The vehicle may be a vehicle drivable using muscle power and/or—in particular additionally—using motor power, for example, but not only, an electric bicycle, an e-bike, a pedelec, or the like.

In the field of vehicles in general and in the field of vehicles drivable using muscle power and/or—in particular additionally—using motor power, in the case of e-bikes, pedelecs, and the like, hydraulic braking systems are increasingly being used. ABS functions are also often implemented therein. Upon activation of the ABS function, brake fluid is introduced from the wheel cylinder via a secondary circuit into a receptacle vessel, the so-called accumulator, and temporarily stored therein. The brake fluid temporarily stored in the accumulator has to be recirculated at a later point in time into the storage vessel or reservoir of the master unit or the master cylinder at the brake lever or the like. Additional components are conventionally required in the secondary circuit of the braking system for the recirculation of the brake fluid into the storage vessel or reservoir, which increase installation space, weight, and costs of the overall braking system.

SUMMARY

A control method according to the present invention for a hydraulic braking system may have the advantage over the related art that brake fluid may be recirculated reliably via the primary circuit of the braking system and thus without a recirculation pump and/or check valve of a secondary circuit into the reservoir of the master cylinder. This may be achieved according to an example embodiment of the present invention in that a method is provided for controlling the operation of a hydraulic braking system of a vehicle, and in particular a vehicle drivable using muscle power and/or—in particular additionally—using motor power, an electric bicycle, e-bike, pedelec, or the like, in which it is checked whether a discharge condition for discharging an accumulator of the braking system is met and—if the discharge condition is met—initially a controllable inlet valve in a primary circuit of the braking system is set into a partially closed state over a predefined duty cycle, in particular of 10%, and/or for a predefined first time span, and then an outlet valve of the accumulator—continuously or in intervals—is opened for a predefined second time span, so that brake fluid is discharged from the accumulator via the outlet valve, the inlet valve, and the primary circuit into a reservoir of a master cylinder or a master cylinder of the primary circuit. Due to these measures, without the necessity of a secondary circuit including recirculation pump and/or check valve, brake fluid may be recirculated from the accumulator in the area of the brake actuator and in particular into a reservoir of a master cylinder or the master cylinder. Installation space, weight, and costs in an underlying braking system are thus reduced.

One main feature of the present invention is thus a particularly suitable routine or arrangement of method steps for discharge of an accumulator of a hydraulic braking system, because of which this is also referred to hereinafter as an ADR method or in short as the ADR (accumulator discharge routine).

The present invention may also be applied in particular in the area of motorized two-wheel vehicles, small motorcycles, and narrow track vehicles.

Preferred refinements of the present invention are disclosed herein.

In accordance with an example embodiment of the present invention, the values of the first and second time spans may be selected and set as a function of limiting values or threshold values, preferably of values of one or multiple of the following parameters or variables: (1) the filling of the accumulator, for example, estimated or determined by an already existent software module, (2) an attachment position, in particular a height difference between a sensor and an ABS control unit, (3) a flow resistance, in particular defined by brake line length and temperature, (4) values of one or multiple properties of the brake fluid property, for example, the viscosity and the temperature.

In one preferred specific embodiment of the control method according to the present invention for the operation of a hydraulic braking system, in particular a braking system is used, (i) which is designed including a primary circuit, which includes a brake sensor and the master cylinder including a reservoir for brake fluid located upstream and a wheel cylinder for actuating a wheel brake located downstream, (ii) which includes a brake line in the primary circuit, by which the master cylinder and the wheel cylinder are and become connected to one another via the controllable inlet valve in the brake line, and (iii) which is designed including an accumulator circuit, which branches off downstream from the inlet valve out of the brake line with an accumulator line at a branching point or a branching position and terminally including the accumulator for the controllable accommodation of brake fluid including the controllable outlet valve between the branching point and the accumulator.

Different partial conditions are possible, which are listed hereinafter—but not exhaustively—and according to the present invention may be linked individually or in any logical combination with one another to form a discharge condition for the ADR method, which establishes under which conditions the ADR method is carried out.

According to one preferred refinement of the method according to the present invention, the discharge condition is met when a pressure of the brake fluid in the primary circuit or primary branch corresponds to an atmospheric ambient pressure or assumes its value or alternatively or additionally is less than a predefined threshold value.

Furthermore, it is possible according to an alternative or additional exemplary embodiment of the present invention that the discharge condition is met when—possibly additionally or alternatively—immediately chronologically preceding, a fill level of the accumulator has exceeded a predefined value, thus in particular has reached a minimum fill level.

According to another specific embodiment of the method according to the present invention, the discharge condition is met when—possibly additionally or alternatively—immediately chronologically preceding, the braking system was operated using an ABS procedure, in which—in particular at least once—a pressure drop in the wheel cylinder and/or in a part of the brake line located downstream was effectuated using the accommodation of brake fluid in the accumulator.

Furthermore, it may be considered that according to another refinement of the method according to the present invention, the discharge condition is met when—possibly additionally or alternatively—the underlying vehicle and/or the braking system is or was restarted and/or moved from an idle state into an activated state.

For a particularly high degree of reliability, the discharge condition is met in another specific embodiment of the method according to the present invention when—possibly additionally or alternatively—since a last point in time at which the discharge condition was met, a predefined time span has elapsed and/or a predefined number of braking operations has been carried out using the braking system, in particular weighted over the strength and/or time span of the braking operations, in particular without an ABS procedure having been carried out using the braking system.

For reasons of a noise-sensitive implementation of the present invention, making carrying out the ADR method a function of the velocity of the underlying vehicle also suggests itself, so that the discharge condition is met when—in particular additionally or alternatively—the velocity of the underlying vehicle exceeds a predefined limiting value $v_G$.

The limiting value or threshold value may preferably be selected and set as a function of values of one or multiple of the following parameters or variables: (1) the filling of the accumulator, for example, estimated or determined by an already existent software module, (2) an attachment position, in particular a height difference between a sensor and an ABS control unit, (3) a flow resistance, in particular defined by brake line length and temperature, (4) values of one or multiple properties of the brake fluid, for example, the viscosity and the temperature.

Furthermore, the present invention relates to a device for controlling the operation of a hydraulic braking system of a vehicle and in particular a vehicle drivable using muscle power and/or—in particular additionally—using motor power, an electric bicycle, e-bike, pedelec, or the like. This device is designed and/or includes means to prompt, carry out, and/or control a specific embodiment of the method according to the present invention.

Furthermore, the subject matter of the present invention is a braking system of a vehicle in particular drivable using muscle power and/or—in particular additionally—using motor power, in particular an electric bicycle, e-bike, pedelec, or the like. The braking system is configured and includes means such that a specific embodiment of the method according to the present invention is or may be prompted, carried out, or controlled and/or the braking system may be used in such a method. In particular, the braking system includes the device according to the present invention for control.

In one advantageous specific embodiment of the present invention, the braking system is designed including a primary circuit, which includes a brake sensor and a master cylinder including reservoir located upstream and a wheel cylinder for actuating a wheel brake located downstream.

Additionally or alternatively, a brake line is formed in the primary circuit, by which the master cylinder and the wheel cylinder are connected to one another via a controllable inlet valve in the brake line.

Furthermore, in accordance with an example embodiment of the present invention, an accumulator circuit is additionally or alternatively formed, which branches off downstream from the inlet valve at a branching point from the brake line with an accumulator line and terminally includes an accumulator for the controllable accommodation of brake fluid including a controllable outlet valve between the branching point and the accumulator.

A vehicle and in particular a vehicle drivable using muscle power and/or—in particular additionally—using motor power, an electric bicycle, e-bike, pedelec, or the like are the subject matter of the present invention. These vehicles include a braking system designed according to the present invention for braking an assembly of the particular vehicle and in particular a wheel.

BRIEF DESCRIPTION OF THE DRAWINGS

Specific embodiments of the present invention are described in detail with reference to the figures.

FIGS. 6 through 8 show various scenarios in the form of graphs, which may come into effect in specific embodiments of the method according to the present invention for controlling a braking system.

DETAILED DESCRIPTION OF EXAMPLE EMBODIMENTS

Figure 1:
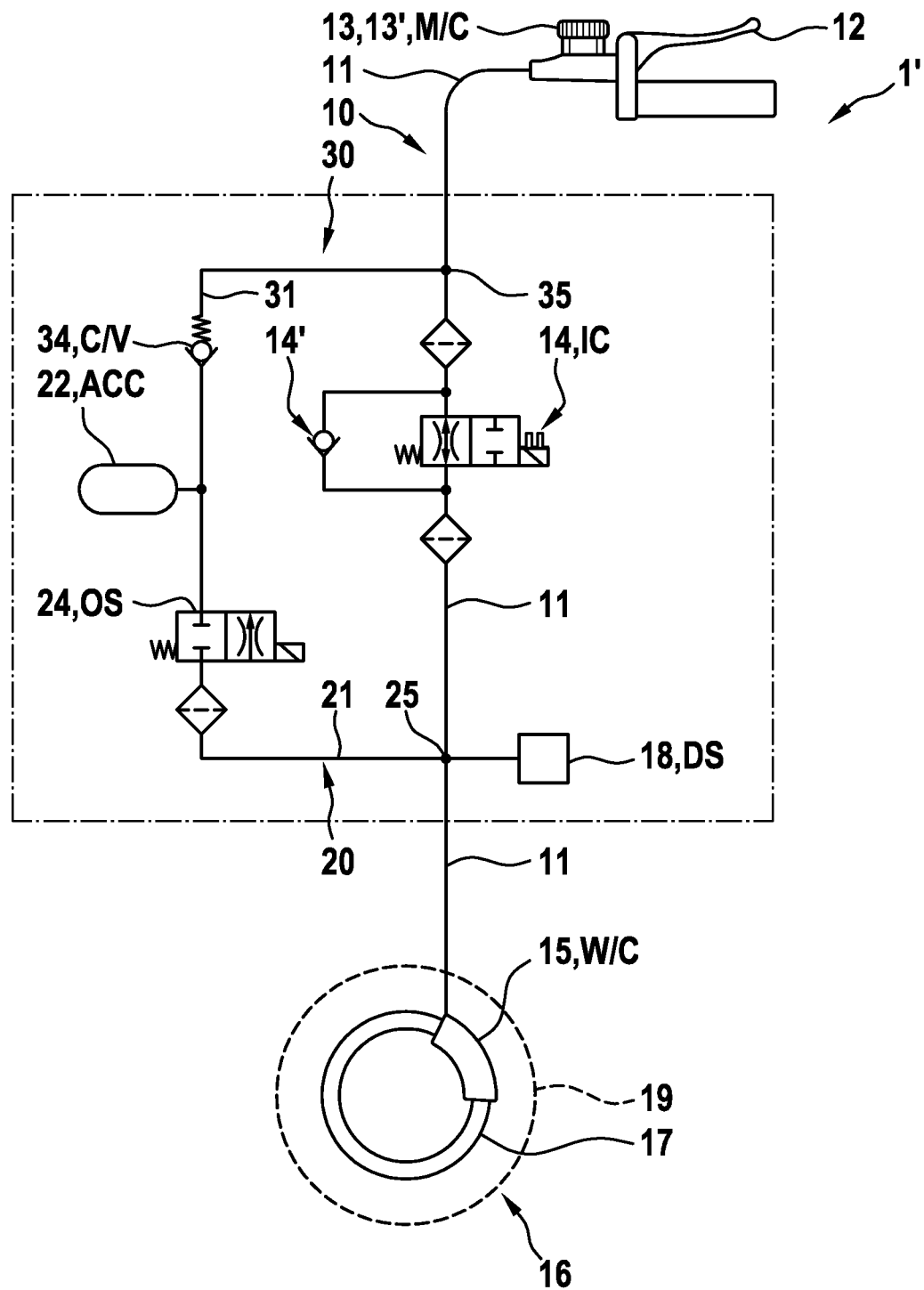
FIG. 1 schematically shows a conventional hydraulic braking system.

Exemplary embodiments of the present invention and the technical background are described in detail hereinafter with reference to FIGS. 1 through 8. Identical and equivalent and identically or equivalently acting elements and components are identified by the same reference numerals. The detailed description of the identified elements and components is not reproduced in each case of their appearance.

The illustrated features and further properties may be isolated from one another in arbitrary form and combined arbitrarily with one another, without departing from the main features of the present invention.

The present invention is explained with regard to configuration and function hereinafter with reference to FIGS. 4 through 8 and is related to conventional braking systems and their operation, as are shown in conjunction with FIGS. 1 through 3.

Figure 4:
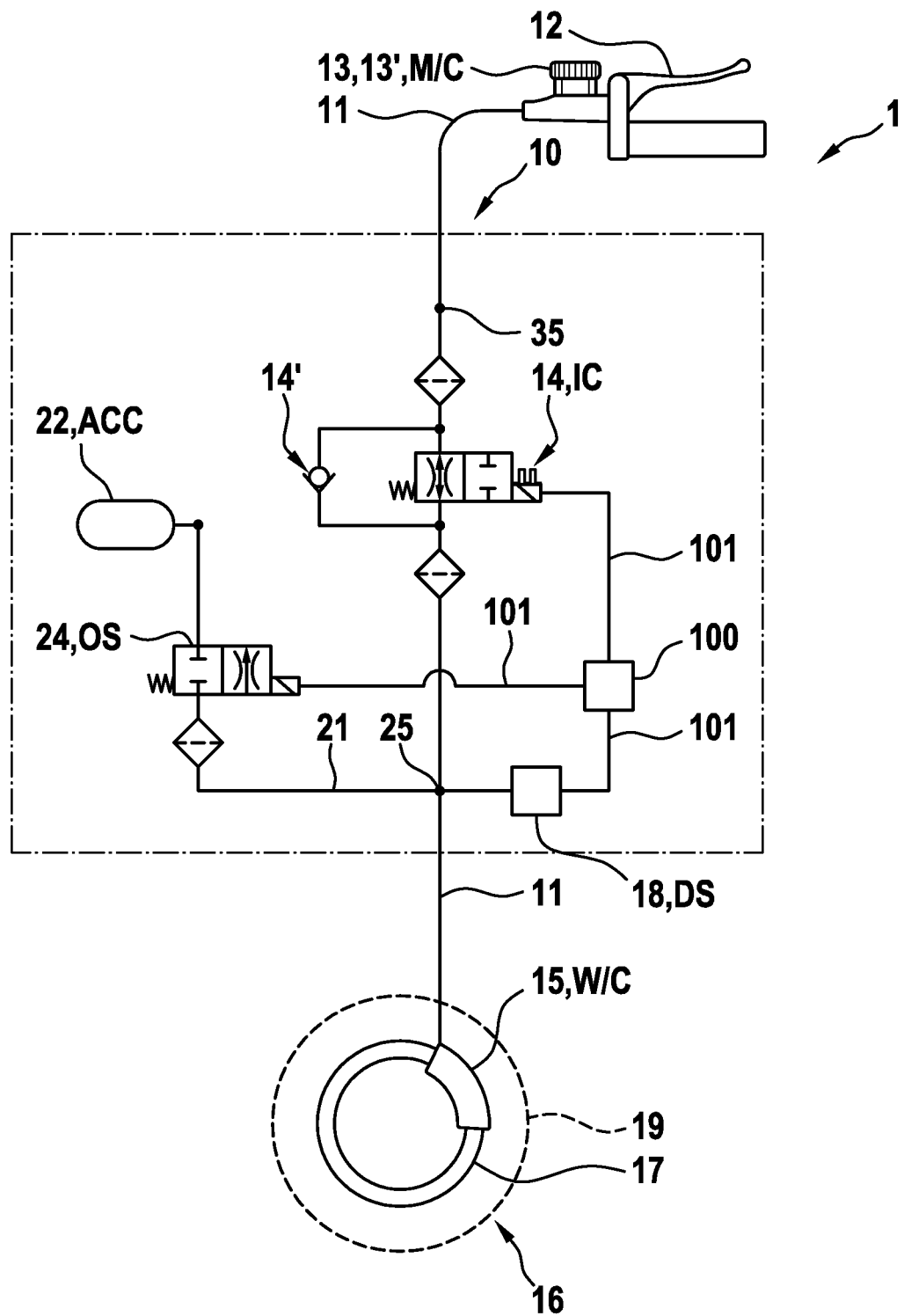
FIG. 4 schematically shows a braking system designed according to the present invention, which may be used with specific embodiments of the method according to the present invention for control.

For this purpose, FIG. 4 schematically shows a braking system 1 designed according to the present invention, which may be used with specific embodiments of the method according to the present invention for control.

This conventional braking system includes a primary branch 10 or primary circuit 10 including a wheel cylinder 15, W/C, terminally formed downstream with respect to provided brake fluid, to which the brake fluid from a brake sensor 12 terminally situated upstream including brake cylinder 13 or master cylinder M/C and reservoir 13' may be applied via a brake line 11 to actuate a brake or wheel brake 16 for an engagement on a brake disk 17 of a wheel 19 to be braked.

A controllable inlet valve 14, IC (IC: inlet continuous valve) is formed in brake line 11, from which a pressure sensor 18, DS is situated located downstream at a branching point 25.

Also at branching point 25, thus between inlet valve 14 and wheel cylinder 15, accumulator branch 20 or accumulator circuit 20 branches off with an accumulator line 21, an outlet valve 24, OS (OS: outlet switch valve) formed in accumulator line 21, and an accumulator 22, ACC located upstream and terminally in accumulator line 21 for the controllable accommodation of brake fluid from wheel cylinder 15 to implement an ABS function by a forced pressure drop in wheel cylinder 15.

Furthermore, a control unit 100 is operationally connected for operation via corresponding detection and/or control lines to inlet valve 14, IC, pressure sensor 18, and outlet valve 24, OS.

FIG. 1 shows a conventional braking system 1' in comparison thereto. In addition to the components shown with reference to the braking system 1 according to the present invention in FIG. 4, this system includes a secondary branch 30 or secondary circuit 30 including secondary line 31 and merging point 35 for merging into brake line 11. Secondary line 31 is fluidically connected via merging point 35 located downstream to accumulator line 21 and includes a check valve 34, C/V located downstream from merging point 35.

Figure 3:
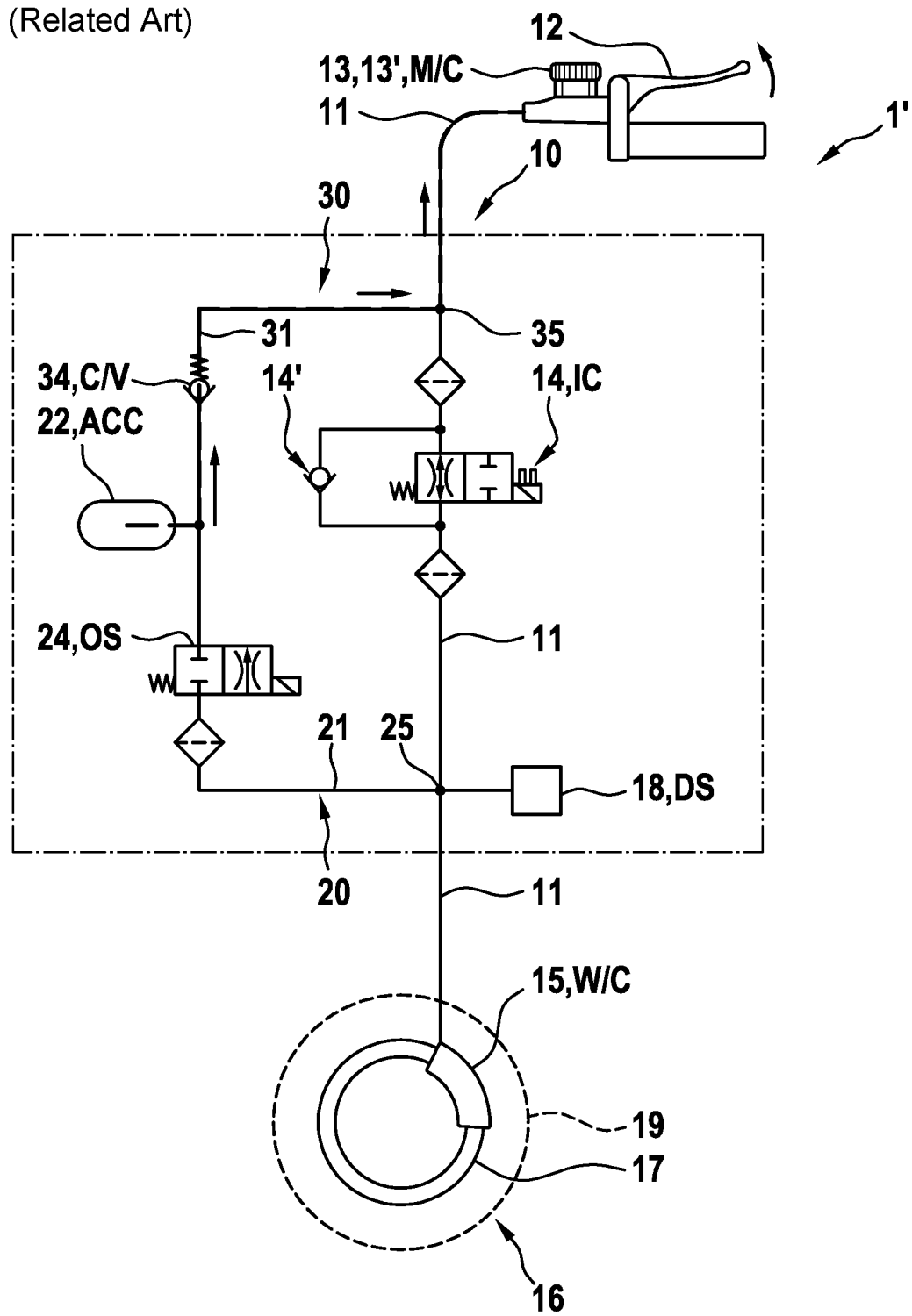

This check valve 34, C/V is conventionally required for the discharge shown in FIG. 3 of accumulator 22 via secondary branch 30, merging point 35, and the part of brake line 11 located upstream, but occupies installation space, and results in additional weight and corresponding costs.

Figure 2:
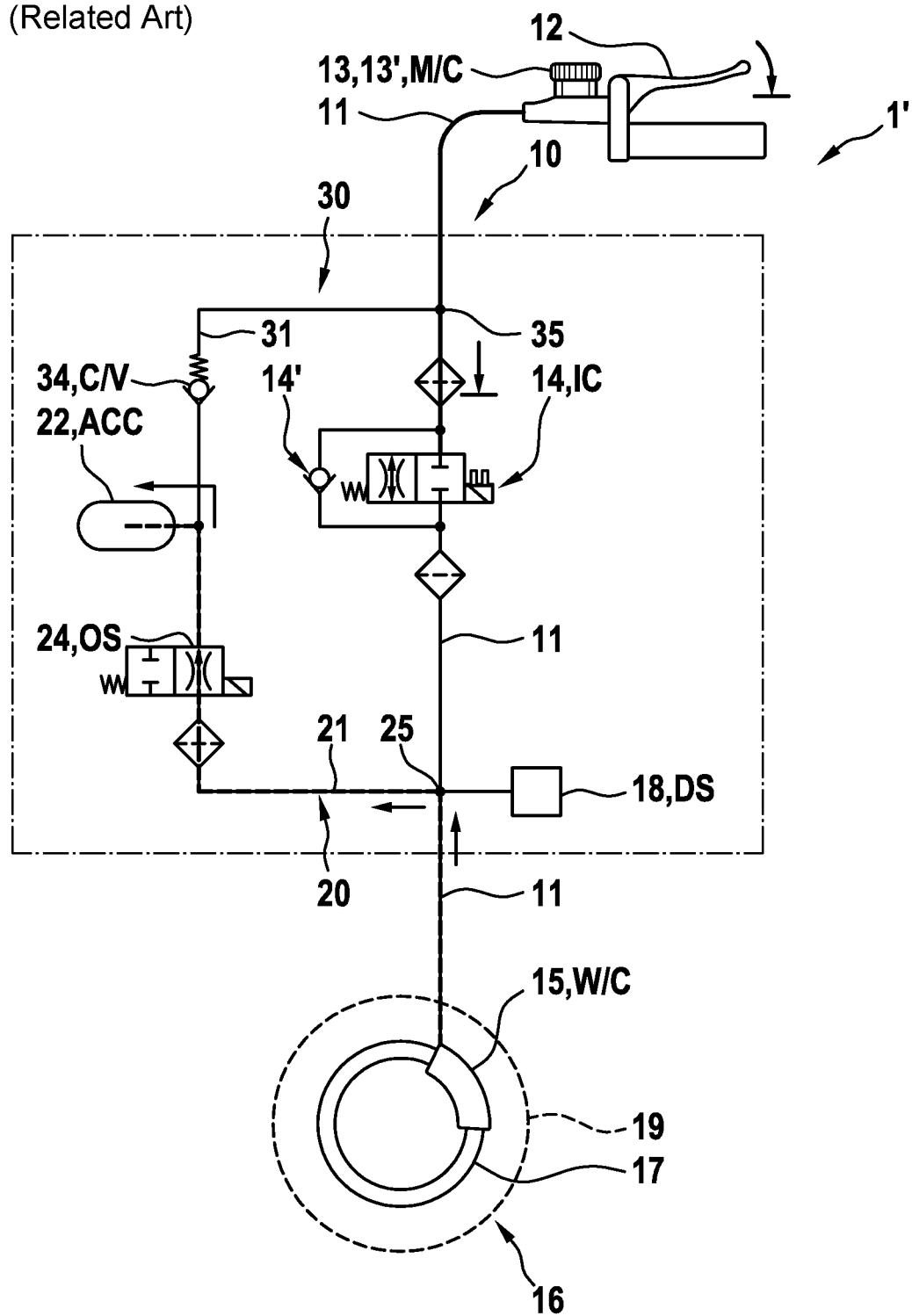
FIGS. 2 and 3 show the conventional hydraulic braking system from FIG. 1 in a braked state using an ABS operation or in a state including a discharge of the accumulator in conventional form via the secondary circuit including a check valve.

In contrast, according to the present invention—as shown in FIG. 4—in the present invention conventionally required secondary circuit 30 from FIGS. 1 through 3 may be omitted, the discharge of accumulator 22 taking place by way of the ADR method provided according to the present invention via the same fluid-mechanical path as is used conventionally (and also in the present invention) for braking and for the ABS operation according to FIG. 2.

Figure 5:
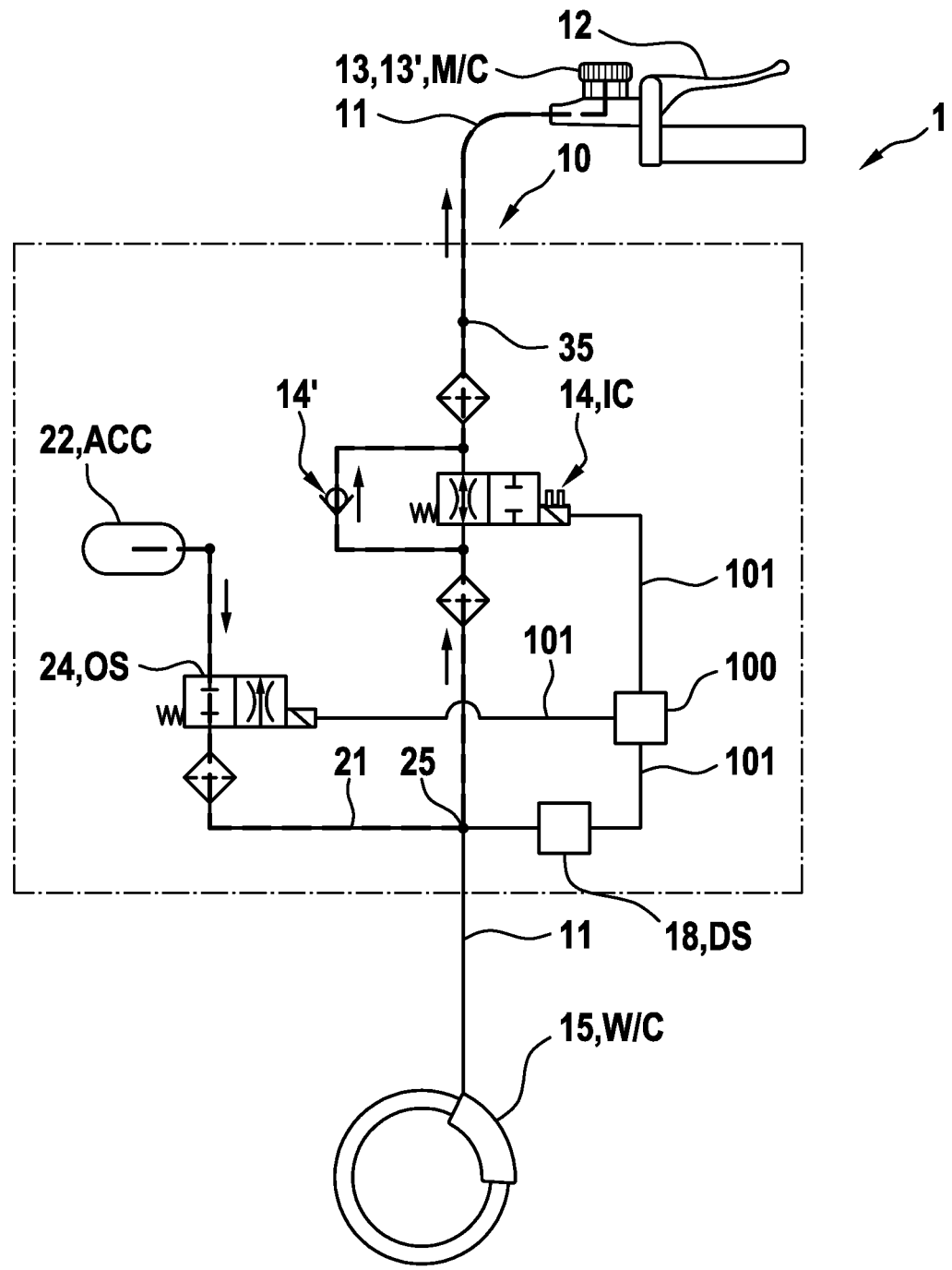
FIG. 5 explains in schematic form the procedure according to the present invention of discharging the accumulator in one specific embodiment of the braking system according to the present invention from FIG. 4.

The ADR method according to the present invention and thus the procedure according to the present invention for discharging accumulator 22, ACC are shown in conjunction with FIG. 5.

A main feature is that in the depressurized case of primary branch 10 or primary circuit 10, when the pressure of the brake fluid disappears there or is sufficiently low, the brake fluid collected in accumulator 22, ACC is recirculated via accumulator line 21 and the part of brake line 11 located upstream from branching point 25 with partially closed inlet valve 14, IC and/or, to bypass it, via a check valve 14' into master cylinder 13, M/C and its reservoir 13'.

FIGS. 6 through 8 show various scenarios in the form of graphs, which may come into effect in specific embodiments of the method according to the present invention for controlling a braking system 1 according to the present invention.

In graph 60 of FIG. 6, the profile of time t is shown by track 63 on abscissa 61 and vehicle velocity v as a function of time t is shown on ordinate 62. Point in time tl is shown at 64, at which, after the starting of the vehicle and braking system 1 according to the present invention at point in time t =0, the ADR method according to the present invention is carried out for the first time, after the operational beginning, in particular a certain limiting or minimum velocity $v_G$ of the vehicle having to be achieved so that possible operating noises upon switching of valves 14, 24 are concealed by the driving noise for the user.

FIG. 7A describes various scenarios of the ADR method according to the present invention in the form of a graph 70 including time t plotted on abscissa 71 and vehicle velocity v plotted for track 73 on ordinate 72 and ABS activation plotted for track 74.

In conjunction with activations 75-1 and 76-1 of the ABS system, immediately after a particular ABS activation 75-1, 76-1, the corresponding discharge of accumulator 22, ACC takes place at points 75-2 and 76-2, i.e., temporally immediately after a respective ABS activation 75-1, 76-1.

With activation 77-1 for the ABS system, it may be seen in context that corresponding ADR procedures 77-2 is first initiated when vehicle velocity v has exceeded a predetermined threshold value $v_G$. This condition is also met at points 75-2 and 76-2 for the corresponding discharges of accumulator 22, ACC.

Figure 7B:
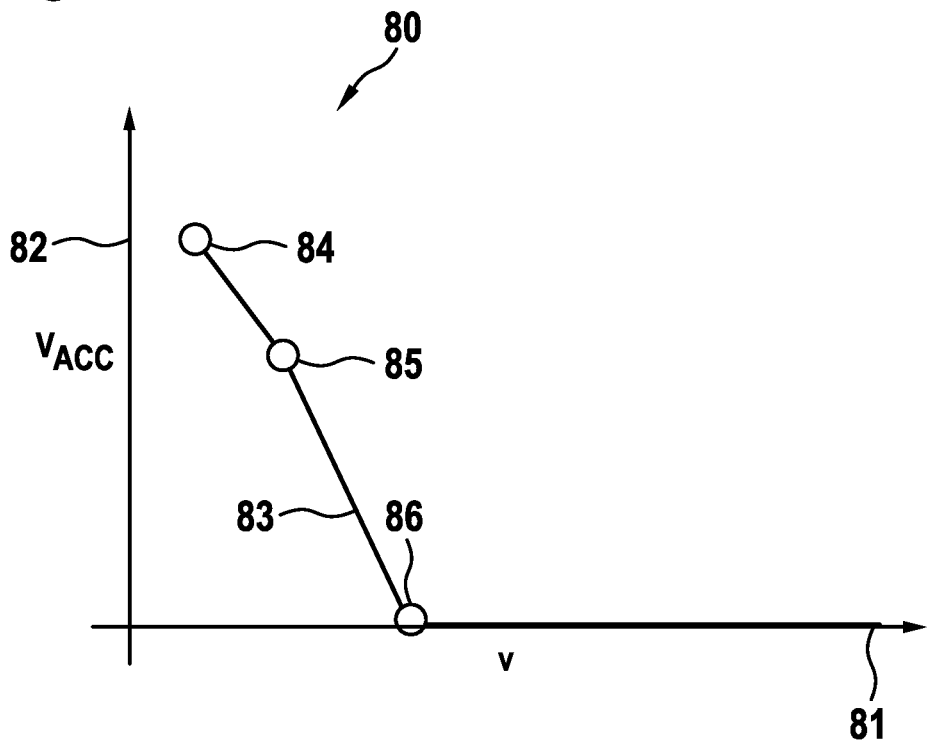

Graph 80 from FIG. 7B describes, using vehicle velocity v plotted on abscissa 81 and accumulator volume $V_{ACC}$ plotted on ordinate 82 in track 83, the corresponding operational relationship via settings including value pairs 84, 85, and 86 including corresponding values.

Figure 7C:
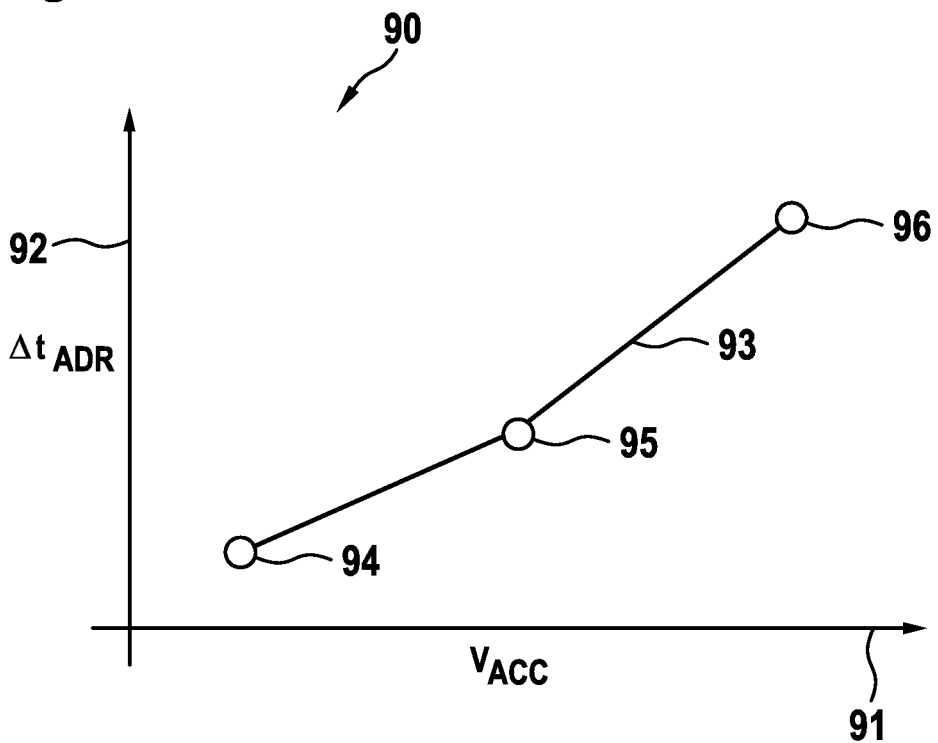

Correspondingly, graph 90 from FIG. 7C shows the corresponding relationship to value pairs 94, 95, and 96 and corresponding values with track 93 and accumulator volume $V_{ACC}$ plotted on abscissa 91 and ADR time span $\Delta t_{ADR}$ plotted on ordinate 92.

FIG. 8 [shows], using track 113 for the profile of vehicle velocity v and track 114 for the normal brake activation and time t plotted on abscissa 111 and vehicle velocity v or normal brake activation plotted on ordinate 112, that at 115, thus after the switching on, the ADR method is run through for the first time, and after a predetermined time span tG as a limiting value including normal braking activities 116, a so-called long-term ADR takes place at 117, the value for the long-term ADR already being reset upon the normal braking at 118.

These and further features and properties of the present invention are explained in greater detail on the basis of the following descriptions:

Conventionally, in a hydraulic braking system 1' the recirculation of brake fluid from accumulator 22, ACC into reservoir 13' at master cylinder 13, M/C may also be implemented without the requirement of a recirculation pump, but then a secondary circuit or secondary branch 30 is required in conventional braking system 1' including a check valve 34, C/V (C/V: check valve), due to which increases result in installation space, weight, and costs. Such a conventionally operated braking system 1' is shown in conjunction with FIG. 1.

Dispensing with a recirculation pump has the result that the brake fluid flowing into hydraulic accumulator 22, ACC after a brake pressure reduction at wheel cylinder 15, W/C (W/C: wheel caliper) initially remains in accumulator 22, ACC, as is shown in FIG. 2 in conjunction with a conventional braking system 1' using a conventional control method.

The brake fluid is thus not pushed back by a recirculation pump into primary circuit 10 in the following brake pressure reduction. Only when primary circuit 10 is depressurized, i.e., when, for example, the driver has released brake lever 12, the brake fluid, because of a compression and pneumatic spring in accumulator 22, ACC and the fluid compression in secondary circuit 30, flows via check valve 34, C/V back into primary circuit 10 and reservoir 13' in the area of master cylinder 13, M/C, as is shown in conjunction with FIG. 3 for a conventional braking system 1' using a conventional control method.

It would be desirable to dispense with check valve 34, C/V and the corresponding branch of secondary circuit 30 of braking system 1' in conjunction with hydraulic braking systems for reasons of saving installation space, weight, and costs, without the recirculation of the brake fluid having to be implemented by other additional components.

It is therefore a core aspect of the present invention to control the remaining components in conjunction with accumulator 22, ACC and primary circuit 10 of a hydraulic braking system 1 in their operation in such a way that in spite of dispensing with the recirculation pump and check valve 34, C/V, the recirculation of the brake fluid may take place reliably via primary circuit 10 of braking system 1.

This basic feature is schematically shown in conjunction with FIGS. 4 and 5, FIG. 4 showing the remaining structural components, i.e., while omitting a recirculation pump and check valve 34, C/V from conventional arrangements and in FIG. 5 additionally explaining the return flow of the brake fluid from accumulator 22, ACC via primary circuit 10 into reservoir 13' of master cylinder 13.

In particular, it is a main feature of the present invention to replace the discharge of accumulator 22, ACC by way of a corresponding SW routine, understood as a method according to the present invention for controlling braking system 1, namely to implement the control of the components in conjunction with accumulator 22, ACC and primary circuit 10.

The method provided according to the present invention is also referred to above and hereinafter as an "accumulator discharge method," as an "accumulator discharge routine," or in short as an ADR method or ADR.

One advantage of the procedure according to the present invention, namely the replacement of secondary circuit 30 or a part thereof by a corresponding control of accumulator 22, ACC and primary circuit 10, is—together with further measures—a significantly smaller and lighter construction of hydraulic unit HU and a cost savings, in particular due to the omission of check valve C/V in conventional secondary circuit 30.

One main feature of the ADR method is to discharge accumulator 22, ACC in the same way as it is charged or was charged.

Therefore, the procedure according to the present invention of the ADR method includes, among other things, temporarily opening in a suitable manner outlet switching valve or outlet valve 24, OS in accumulator branch or circuit 20 and inlet valve 14, IC in primary branch 10 of braking system 1 in a depressurized or essentially depressurized state using a suitable activation.

The most important boundary condition for the ADR method according to the present invention is a depressurized or essentially depressurized primary circuit 10. A depressurized primary circuit 10 may be recognized, for example, by an evaluation of pieces of pressure sensor information via a pressure sensor 18, DS on the W/C side.

Since the driver may actuate brake 12 again at any time, it is important to ensure that during such a renewed braking situation, no brake fluid flows into accumulator ACC, since the OS valve is open. This is achieved in that inlet valve 14, IC, in one preferred specific embodiment of the method according to the present invention, is only partially opened, thus accordingly also remains partially closed, while the ADR method runs.

Inlet valve 14, IC is only partially open or thus remains partially closed in that a correspondingly determined duty cycle for the PWM control of inlet valve 14, IC is applied. The duty threshold is established based on a compromise between avoiding a high-volume flow to the W/C side and thus to accumulator 22, ACC and underbraking wheel 19 due to a low volume flow to the W/C side and thus a delayed pressure rise.

FIG. 5 describes in summary the activation of valves 24, OS and 14, IC and the volume flow resulting therefrom in a depressurized state in primary circuit 10 of braking system 1 and thus shows the operational relationships during an accumulator discharge with depressurized or essentially depressurized primary circuit 10.

If a renewed brake application is requested while the ADR method is being carried out, the renewed braking being recognized by evaluating pressure sensor 18, DS, the valve actuation is reset immediately: outlet valve 24, OS closed, inlet valve 14, IC opened. After primary circuit 10 is depressurized again, the ADR method may start again Among other things, the ADR method according to the present invention may be carried out in three different situations, which are described in detail hereinafter, but may also be arbitrarily combined with one another: (1) ADR takes place immediately after an ABS event if a pressure drop has occurred at least once during this ABS event and accumulator 22, ACC is (thus) partially filled.

(2) ADR takes place when the e-bike system is started and it is not known whether one or multiple normal braking events have taken place during the switched-off state, which may have resulted in partial filling of accumulator 22, ACC, for example, via a not fully avoidable leak of outlet valve 24, OS.

(3) ADR takes place when the e-bike has been switched on for a long time and (a) one or multiple normal braking events have taken place, which may have resulted in partial filling of accumulator 22, ACC due to an unavoidable leak of outlet valve 14, OS, and (b) no ABS event has taken place in conjunction with a pressure drop and therefore no ADR actuation took place according to situation 1.

As a further possible condition—in addition to a depressurized or essentially depressurized primary circuit 10 and one of the three above-mentioned situations—a certain vehicle velocity $v_G$ may be set, which has to be exceeded so that the ADR method is carried out.

One main goal for accommodating the velocity condition in one specific embodiment of the ADR method according to the present invention is to avoid problems due to valve clicking noises.

The following representations in conjunction with 10 listings and FIGS. 6 through 8 describe in greater detail above-described situations (1) through (3) and the corresponding conditions for the intervention of the ADR method according to the present invention.

Ad (2): FIG. 6 thus shows an overview of the implementation of the ADR method in conjunction with the startup of the system of the underlying e-bike or the like.

1. No pressure input via the brake, i.e., the pressure in primary line 11 is less than a predefined upper pressure limit.
2. Vehicle velocity v is possibly greater than a predefined lower velocity limit ($v_G$), as soon as the system may activate the ADR method.
3. Partially closing inlet valve 14, IC using a duty cycle of 10%.
4. Opening outlet valve 24, OS for a predetermined time span.

If brake 12 is actuated during the discharge of accumulator 22, ACC, for example using a certain minimum pressure, the discharge of accumulator 22, ACC is not yet completed. As soon as the braking procedure is ended in this state, brake 12 is thus released, the ADR procedure according to the present invention begins again to complete the discharge of accumulator 22, ACC.

It is to be noted in conjunction with FIG. 6 that the provided time span may be that time constant which is required to completely discharge completely filled accumulator 22, ACC.

Ad (1): FIGS. 7A through 7C show an overview of the ADR method according to the present invention after the occurrence of an ABS incident.
1. To lower the pressure at wheel cylinder 15, W/C, a certain volume was transferred by the ABS controller into accumulator 22, ACC.
2. No pressure input via the brake, i.e., the pressure in primary line 11 is less than a predefined upper pressure limit.
3. Optionally, a minimum required vehicle velocity may be or become provided for activating the ADR method in order to prevent clicking noises upon the valve activation. Minimum required vehicle velocity $v_G$ may be selected as a function of accumulator volume $V_{ACC}$ and/or of the fill level of accumulator 22, ACC.
4. Partially closing inlet valve 14, IC using a duty cycle of 10%.
5. Opening outlet valve 24, OS, for example, for predetermined time span t and/or as a function of accumulator volume $V_{ACC}$ and/or of the fill level of accumulator 22, ACC.

If brake 12 is actuated during the discharge of accumulator 22, ACC, the discharge of accumulator 22, ACC is not yet completed. As soon as the braking procedure is ended in this state, brake 12 is thus released, the ADR procedure according to the present invention begins again to complete the discharge of accumulator 22, ACC, for example, using a time span t of at most 350 ms for the opening of outlet valve 24, OS.

It is also to be noted that the core algorithm of the ABS method advantageously includes, for example, a way for determining the fill level of accumulator 22, ACC. The fill level may be ascertained, for example, on the basis of the opening time span for outlet valve 24, OS, the information with respect to the pressure sensor, and the characteristic of the pressure sensor with respect to elasticity and rigidity of both the brake and also accumulator 22, ACC. The ascertained fill level for accumulator 22, ACC enables the adaptation of the time spans for the ADR method to the present boundary conditions.

Ad (3): FIG. 8 describes the implementation of the ADR method in conjunction with the long-term behavior of underlying braking system 1.
1. The ADR method is carried out each time a predetermined comparatively long time span, including exclusively normal brake activity, that is to say without ABS interventions, has elapsed. This may mean in particular that after each ABS activation, the value of the already elapsed time is reset to 0. The already elapsed time is also reset to the value 0 each time upon a restart of the system, thus of the braking system and/or the e-bike.
2. No pressure input via the brake, i.e., the pressure in primary line 11 is less than a predefined upper pressure limit.
3. It is optionally checked whether the vehicle velocity exceeds a predefined value ($v_G$) to then begin the ADR method.
4. Partially closing inlet valve 14, IC using a duty cycle of, for example, 10%.
5. Opening outlet valve 24, OS for a predetermined time span, for example, for 150 ms, or, for example, as a function of accumulator volume $V_{ACC}$ and/or of the fill level of accumulator 22, ACC.

If brake 12 is actuated during the discharge of accumulator 22, ACC, for example, using a certain pressure, the discharge of accumulator 22, ACC is not yet completed. As soon as the braking procedure is ended in this state, brake 12 is thus released, the ADR procedure according to the present invention begins again to complete the discharge of accumulator 22, ACC, for example, using a certain time span for the opening of outlet valve 24, OS.

It is to be noted that for all operating situations, the frequency of the activation of the ADR method and/or the opening time span for outlet valve 24, OS may be selected as a function of a possible leak of outlet valve 24, OS and/or of a predefined permitted and/or actual fill level of accumulator ACC, in particular at the beginning of the ADR method and/or an ABS situation, and/or of a temperature of the brake fluid, a type of the brake fluid, for example a brake oil, and/or a position of the installation of the braking system and in particular the hydraulic unit in relation to the underlying vehicle. The predefined permitted fill level may be defined to a value which is suitable to ensure legal boundary conditions and/or performance requirements. The value may be ascertained, for example, from vehicle tests.

The opening time span for outlet valve 24, OS may be applied continuously, or divided into two or more sections including intervals in between, which are identical or different. The manner of the application of the opening time span and its possible division and the selection of the intervals may be made as a function of volume $V_{ACC}$ of accumulator 22, ACC, its fill level, and/or the opening time span of outlet valve 24, OS.

What is claimed is:

1. A method for controlling discharge of an accumulator of a hydraulic braking system of a vehicle powered by muscle and/or motor power, wherein a brake fluid is discharged from the accumulator via an outlet valve of the accumulator, a primary circuit of the braking system, and an inlet valve of the primary circuit into a reservoir of a master cylinder of the primary circuit, the method comprising the following steps:
   checking whether a discharge condition for discharging an accumulator of the braking system is met; and
   based on the discharge condition being met:
     initially moving the controllable inlet valve in the primary circuit into a partially closed state over a predefined duty cycle and/or for a predefined time span, and
     after the initially moving, opening the outlet valve of the accumulator for a predefined time span, continuously or in intervals.

2. The method as recited in claim 1, wherein the vehicle is an electric bicycle or an e-bike or a pedelec.

3. The method as recited in claim 1, wherein the predefined duty cycle is 10%.

4. The method as recited in claim 1, wherein the braking system includes the primary circuit, which includes a brake actuator, the master cylinder including the reservoir located upstream, and a wheel cylinder for actuating a wheel brake located downstream, and wherein the braking system includes a brake line in the primary circuit, by which the master cylinder and the wheel cylinder are connected to one another via the controllable inlet valve in the brake line, and includes an accumulator circuit, which branches off downstream from the inlet valve at a branching point from the brake line with an accumulator line and terminally includes the accumulator for controllable accommodation of the brake fluid including the outlet valve between the branching point and the accumulator.

5. The method as recited in claim 1, wherein the discharge condition is met when a pressure of the brake fluid in the primary circuit corresponds to an atmospheric ambient pressure or is below a predefined threshold value.

6. The method as recited in claim 1, wherein the discharge condition is met when a fill level of the accumulator exceeds a predefined value.

7. The method as recited in claim 1, wherein the discharge condition is met when the braking system was operated using an ABS procedure, in which a pressure drop in the wheel cylinder and/or in a part of the brake line located downstream was effectuated by accommodation of the brake fluid in the accumulator.

8. The method as recited in claim 1, wherein the discharge condition is met when the vehicle and/or the braking system (1) is restarted and/or is moved from an idle state into an activated state.

9. The method as recited in claim 1, wherein the discharge condition is met when a predefined time span has elapsed since a last time at which the discharge condition was met and/or a predefined number of braking procedures was carried out using the braking system, without an ABS procedure having been carried out by the braking system.

10. The method as recited in claim 1, wherein the discharge condition is met when a velocity of the vehicle exceeds a predefined limiting value.

11. A device for controlling a discharge of an accumulator of a hydraulic braking system of a vehicle, the vehicle being powered by muscle power and/or motor power, wherein a brake fluid is discharged from the accumulator via an outlet valve of the accumulator, a primary circuit of the braking system, and an inlet valve of the primary circuit into a reservoir of a master cylinder of the primary circuit, the device configured to:
check whether a discharge condition for discharging an accumulator of the braking system is met; and
based on the discharge condition being met:
initially move the controllable inlet valve in the primary circuit into a partially closed state over a predefined duty cycle and/or for a predefined time span, and
after the initial move, open the outlet valve of the accumulator for a predefined time span, continuously or in intervals.

12. The device as recited in claim 11, wherein the vehicle is an electric bicycle or an e-bike or a pedelec.

13. A hydraulic braking system of a vehicle, the vehicle being powered by muscle power and/or using motor power, the hydraulic braking system comprising:
a device for controlling a discharge of an accumulator of the hydraulic braking system, wherein a brake fluid is discharged from the accumulator via an outlet valve of the accumulator, a primary circuit of the braking system, and an inlet valve of the primary circuit into a reservoir of a master cylinder of the primary circuit, the device configured to:
check whether a discharge condition, for discharging an accumulator of the braking system is met; and
based on the discharge condition being met:
initially move the controllable inlet valve in the primary circuit of the braking system into a partially closed state over a predefined duty cycle and/or for a predefined time span, and
after the initial move, open the outlet valve of the accumulator for a predefined time span, continuously or in intervals.

14. The hydraulic braking system as recited in claim 13, wherein the hydraulic braking system includes the primary circuit which includes a brake actuator, and the master cylinder including the reservoir located upstream, and a wheel cylinder for actuating a wheel brake located downstream, the hydraulic braking system further including a brake line in the primary circuit, by which the master cylinder and the wheel cylinder are connected to one another via the controllable inlet valve in the brake line, and includes an accumulator circuit, which branches off downstream from the inlet valve at a branching point from the brake line with an accumulator line and terminally includes the accumulator for controllable accommodation of the brake fluid using the outlet valve between the branching point and the accumulator.

15. A vehicle powered by muscle power and/or motor power, the vehicle comprising:
a hydraulic braking system, including:
a device for controlling a discharge of an accumulator of the hydraulic braking system, wherein brake fluid is discharged from the accumulator via an outlet valve, a primary circuit of the braking system, and an inlet valve into a reservoir of a master cylinder of the primary circuit, the device configured to:
check whether a discharge condition, for discharging an accumulator of the braking system is met; and
based on the discharge condition being met:
initially move the controllable inlet valve in the primary circuit of the braking system into a partially closed state over a predefined duty cycle and/or for a predefined time span, and
after the initial move, open the outlet valve of the accumulator for a predefined time span, continuously or in intervals.

* * * * *